H. SHEPHARD.
POWER INDICATOR FOR INTERNAL COMBUSTION ENGINES.
APPLICATION FILED OCT. 12, 1920.
1,422,485.  Patented July 11, 1922.
3 SHEETS—SHEET 1.
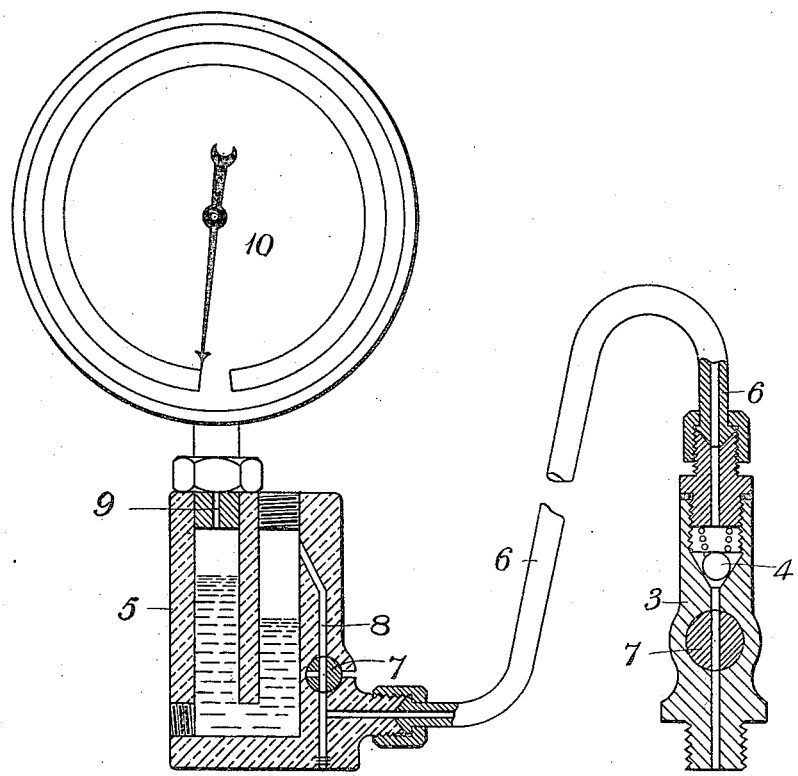
Fig: 1.
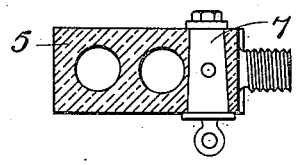
Fig: 2.
Inventor.
Harry Shephard
By B. Smiger, Atty

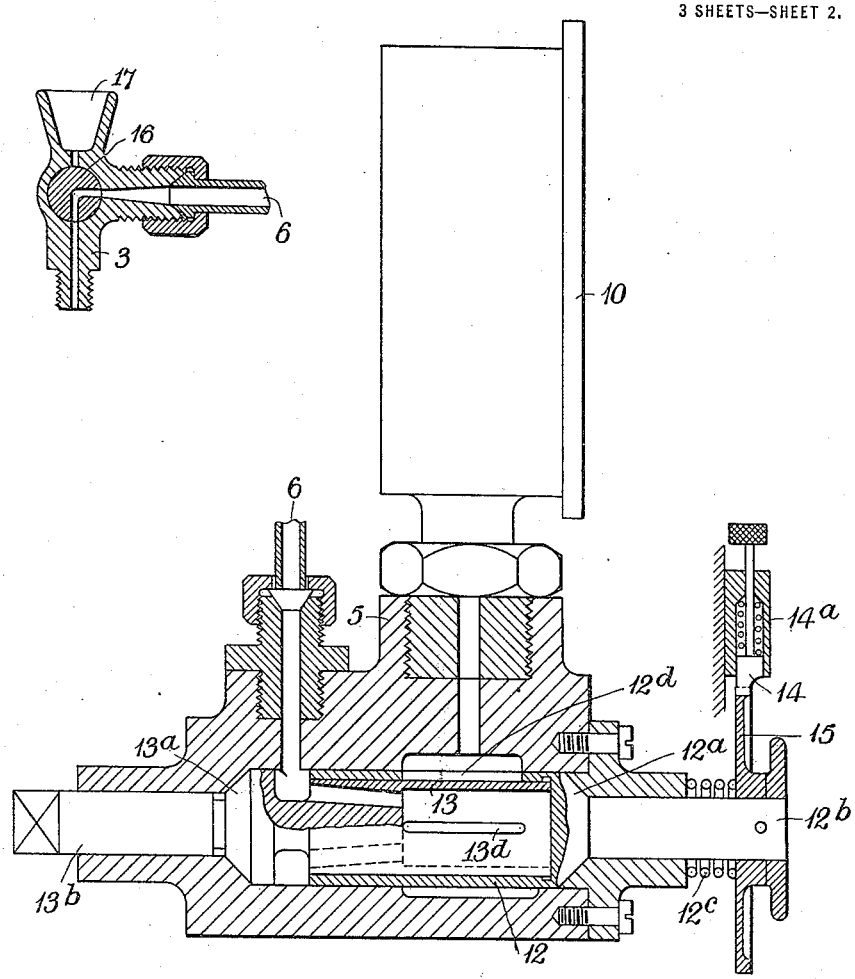
Fig: 3.
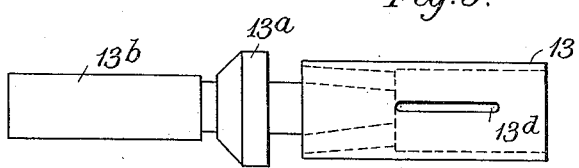
Fig: 5.
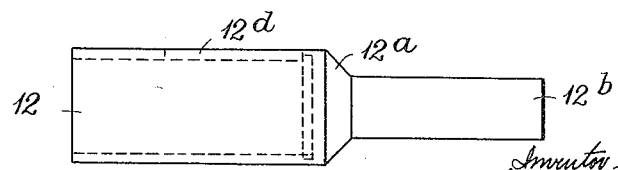
Fig: 6.

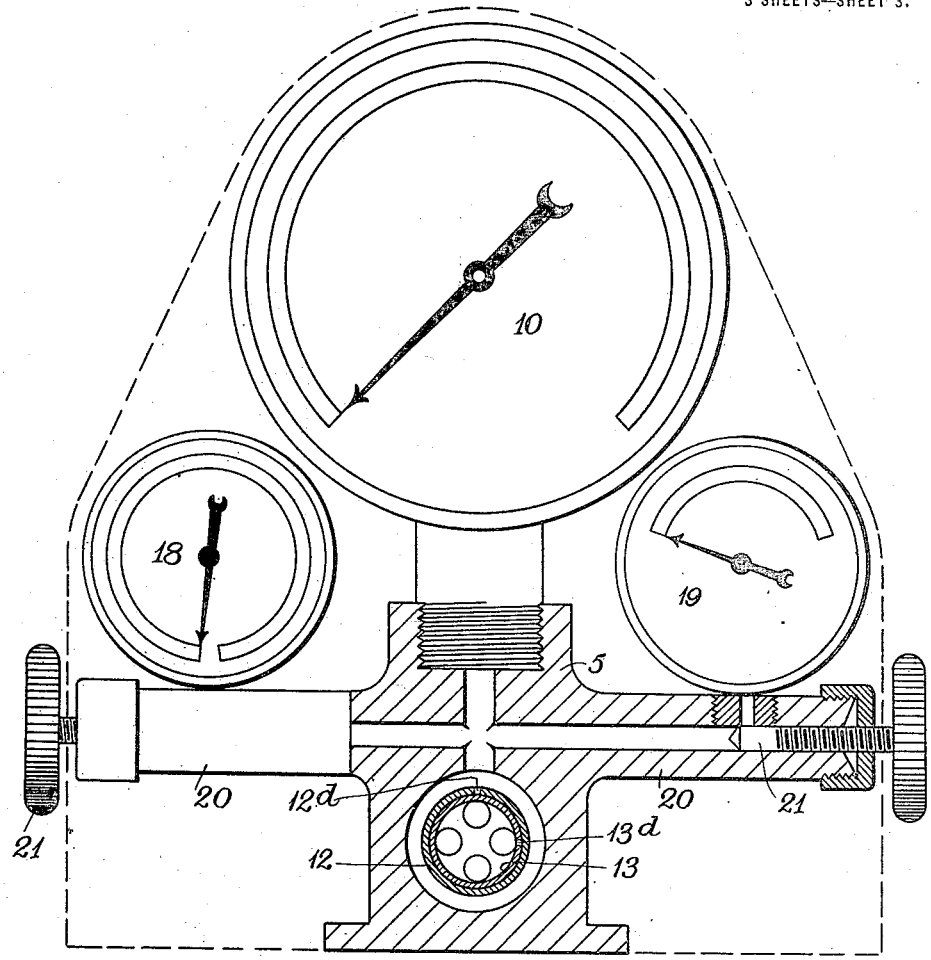
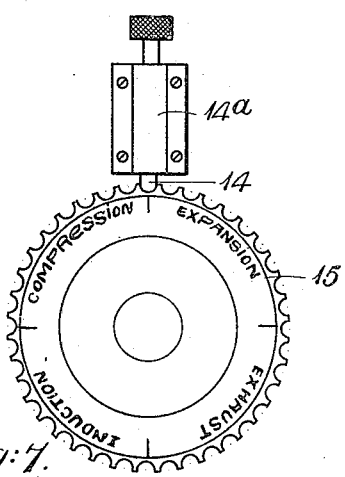

UNITED STATES PATENT OFFICE.

HARRY SHEPHARD, OF COVENTRY, ENGLAND.

POWER INDICATOR FOR INTERNAL-COMBUSTION ENGINES.

1,422,485.   Specification of Letters Patent.   Patented July 11, 1922.

Application filed October 12, 1920. Serial No. 416,546.

*To all whom it may concern:*

Be it known that I, HARRY SHEPHARD, a subject of the King of Great Britain, residing at Coventry, in the county of Warwick, England, have invented new and useful Improvements in Power Indicators for Internal-Combustion Engines, of which the following is a specification.

This invention relates to power indicators for internal combustion engines.

The object of the invention is to place in the hands of users and manufacturers of internal combustion engines a reliable instrument whereby the driver or testroom operator can tell whether or not his engine is working as efficiently as nominally it ought.

Incidentally such an instrument will enable the driver or tester to correctly diagnose the cause or causes of a failure in power either in the engine as a whole or in the individual cylinders of a multi-cylinder engine.

In its simplest form as intended for use as a dash-board instrument or on the steering column of a motor vehicle, a power indicator embodying the present invention operates on the assumption that the power developed within the cylinder of an internal combustion engine is proportional to the maximum pressure during the explosion stroke and may be made to indicate the power at any moment relatively to a fixed maximum representing the highest indicated horse power for a given engine or, if desired the said instrument may be suitably calibrated to shew the actual power developed in the cylinder whilst the engine is running.

For use in the test room means are provided on the instrument whereby the pressure within the engine cylinder for different positions of the working piston may be indicated.

In either case the said instrument may comprise a U-tube or its equivalent containing an oil or the like semi-viscous liquid one column of which is subject to the working pressure within the engine cylinder whilst the other column is connected up with a standard type gauge.

In the accompanying drawings,

Figure 1 represents more or less diagrammatically a power indicator and its connections constructed according to this invention for use as a dashboard or the like instrument for motorists.

Figure 2 is a sectional plan view through the U-tube.

Figures 3 and 4 are two views at right angles to each other of an arrangement of power indicator embodying this invention for use more especially as a test-room instrument.

Figures 5 and 6 are detail views of the inner and outer sleeves respectively.

Figure 7 is a front view of the dial and pointer for the outer sleeve. Throughout the drawings like parts are designated by similar reference characters.

According to the arrangement shewn in Figures 1 and 2 a plug 3 having a comparatively small bore and an outwardly opening non-return valve 4 is adapted for attachment to the cylinder of the engine and arranged so as to allow a fraction of the pressure per square inch developed in the cylinder to be transmitted to a U-tube 5 for which purpose a pipe 6 runs from the outer end of the plug to the said U-tube. The plug or the U-tube or both may be fitted with a cock 7 for throwing the instrument into and out of connection with the engine.

The valve in the plug may, as shewn be of the ball type and if found necessary or desirable a filter or screen may be provided at a suitable point to prevent carbon or other foreign matter finding its way into the U-tube.

The U-tube contains oil or other semi-viscous liquid one column of which is subject to the working pressure within the engine cylinder for which purpose a duct or passage 8 is formed opening above the liquid and communicating with the pipe 6 from the plug.

The other limb of the U-tube is closed except for a fine hole 9 above the level of the liquid therein. This hole communicates with an internally threaded recess adapted to receive the nipple of a gauge 10 of the Bourdon type.

The arrangement is such that with the engine running and the cock or cocks 7 open, as shewn, an accummulation of fluid pressure takes place within the U-tube. This causes the oil therein to exert an increasing pressure on the air above it in the limb communicating with the gauge, the pointer of which moves gradually across its dial until a balance of pressure on both sides of the ball valve is established. When this takes place the pointer except for very slight oscillations due to leakage and other causes, remains stationary and indicates either the comparative or the actual power being developed by the engine according as the dial is simply marked to represent the maximum power of which the engine is capable or is calibrated in terms of horse power.

For calibration purposes a sample engine is taken of a given type and nominal horse power and is connected up with an indicator constructed according to this invention but with a blank dial. The engine is then run through a series of tests at different speeds. For each speed the horse power developed as indicated by a dynamometer or the like is carefully observed. This position of the pointer depends of course upon the pressure in the cylinder at the moment of firing and since this pressure is representative of the power developed as shewn by the dynamometer the dial of the present instrument opposite the highest point reached by the pointer is marked in terms of the horse power developed at that moment and for that particular engine speed. A number of such readings are taken at different engine speeds and the dial of the instrument marked accordingly in terms of the power developed at each speed. An instrument calibrated in this way may be made in quantities for use with engines of the same type and nominal rating as the engine used for calibrating purposes, and whilst such an instrument may not be exactly true for every engine of the same type and rating it is claimed that it will afford the user or attendant a reliable guide as to what power he ought to expect to get for each engine speed and by its action will serve to indicate whether or not a particular engine is working as efficiently as under the conditions it ought to.

In the case of a multi-cylinder engine the various plugs from each cylinder would connect with a single pipe from the U-tube and each plug or branch may have a cock so that any one or more of the cylinders may be tested separately.

In order to enable the instrument to the self-setting i. e. to eliminate the necessity for bringing the pointer back to zero prior to each reading being taken, as by opening a cock in the instrument or its connections, and at the same time to prevent any possibility of an accumulation of pressure in the instrument, provision may be made for a permanent and constant leak at some place on that side the ball valve remote from the engine. This leak being present during the calibration of the instrument would of course be automatically allowed for in the readings.

Referring now to the arrangement shewn in Figures 3, 4, 5, 6 and 7 the U-tube 5 is constructed to accommodate an adjustable cut-off device comprising a pair of concentrically arranged sleeves 12, 13 disposed so as normally to cut off communication between the gauge and the engine cylinder. Each sleeve has a conical head $12^a$, $13^a$ and a shaft or spindle $12^b$, $13^b$ working within bearings formed on or carried by the body of the U-tube. The internal pressure tends to force the conical heads of the sleeves firmly against their seatings with a fluid-tight fit. When not in use the same effect may in each case be maintained by a spring such as $12^c$. One of these sleeves the outer 12, is capable of a limited angular adjustment relatively to a fixed pointer 14 for which purpose the outer end of its spindle $12^b$ is provided with a notched disc or dial 15 and is marked in terms of piston stroke. The pointer 14 may be spring loaded and carried in a casing $14^a$ above the dial on the front of the instrument.

The inner sleeve 13 is free to rotate relatively to the first sleeve and its spindle is provided with a squared end projecting from the back of the instrument and adapted to be driven either from the crank shaft or the half speed shaft of the engine in any suitable and convenient manner.

Each of the two sleeves is formed with a narrow longitudinal port $12^d$, $13^d$ the inner sleeve 13 being in open communication with the engine by way of one of the limbs of the U-tube whilst the port in the outer sleeve 12 opens to the gauge by way of the other limb of the U-tube. This limb is formed with an internally screwed socket for the reception of the nipple of a Bourdon-type gauge 10.

As before described in connection with the dashboard instrument the cylinder head is fitted with a plug 3 which is connected by a pipe 6 with the limb of the U-tube which communicates with the inner sleeve 13 of the cut-off device.

The plug in this case however as will be seen from Figure 3 is slightly modified and has a two-way cock 16 and a priming cup 17. A non-return valve is not provided as in the case of the dashboard instrument shewn in Figures 1 and 2 for the reason that in the present arrangement the pressure in the gauge is secured by the sleeves 12, 13.

The whole apparatus including the pipe to the plug is filled with oil and the arrangement is such that at each revolution of the inner sleeve the port therein passes the port in the outer sleeve thus establishing momentary pressure communication between the engine cylinder and the gauge. The pressure in the gauge accumulates a little each revolution of the inner sleeve until it records the exact pressure in the cylinder at one point of the cycle. In this way the effects of lag or inertia of moving parts is overcome. The dial 15 is then turned one notch and another reading taken.

This operation is repeated until a suitable number of readings have been taken throughout the complete cycle of the engine when the results are plotted and a power curve obtained.

The complete instrument may as shewn incorporate in addition to the principal gauge 10, low pressure and vacuum gauges 18, 19 the former being employed to check readings of less than 100 lbs. per square inch on the main gauge.

To accommodate these extra gauges the limb of the U-tube carrying the principal gauge may be provided as shewn in Figure 4 with lateral extensions 20 above the outer sleeve, said extensions being fitted with stop valves 21 whereby the low pressure and vacuum gauges may be cut in or out of use as and when desired.

As already intimated the construction and arrangement shewn is more or less diagrammatic and the whole device may, if desired, be incorporated in the construction of the gauge itself or may be adapted for direct attachment to the engine. In any case for test room work it would of course be advisable to place the instrument as near to the engine as possible in order to avoid errors due to leakage and other causes.

I claim:

1. Power indicator for internal combustion engines comprising a pressure gauge, a fitting adapted for open communication with the interior of the engine cylinder a U-tube containing a semi-viscous liquid and having the two limbs thereof connected up respectively with the gauge and fitting, and means incorporated with said U-tube whereby pressure communication between the gauge and the engine cylinder through the U-tube may be momentarily established at any desired point in the stroke of the engine piston.

2. Power indicator for internal combustion engines comprising a pressure gauge, a fitting adapted for open communication with the interior of the engine cylinder a U-tube containing a semi-viscous liquid and having the two limbs thereof connected up respectively with the gauge fitting, and an adjustable cut-off device arranged within said U-tube and adapted to be positively opened and closed by the engine to establish momentary communication between the gauge and the interior of the engine cylinder through the U-tube at any desired point in the stroke of the engine piston and setting means calibrated in terms of piston stroke for determining the communication shall take place.

3. Power indicator for internal combustion engines comprising a pressure gauge, a fitting adapted for open communication with the interior of the engine cylinder a U-tube containing a semi-viscous liquid and having the two limbs thereof connected up respectively with the gauge and fitting, and a cut-off device incorporated with the U-tube and comprising a pair of concentric sleeves one of which is adapted for continuous rotation and has a port in open communication with the limb of the U-tube which is connected up with said fitting whilst the other is capable of angular adjustment relatively to the rotary sleeve and has a port in open communication with the other limb of the U-tube connected with the gauge, and means for determining the point in the piston stroke at which the ports in the two sleeves shall register with each other.

4. Power indicator for internal combustion engines comprising a gauge set including high and low pressure and vacuum gauges, a fitting adapted for open communication with the interior of the engine cylinder, a U-tube containing a semi-viscous liquid having one limb in open communication with said fitting and the other limb in open communication with the high pressure gauge and means for establishing operative communication between the latter limb of the U-tube and either of the other gauges.

5. Power indicator for internal combustion engines comprising a gauge set including high and low pressure and vacuum gauges. a fitting adapted for open communication with the interior of the engine cylinder, a U-tube containing a semi-viscous liquid having one limb in open communication with said fitting and the other limb in open communication with the high pressure gauge, and means whereby pressure communication between the gauges and the engine cylinder through the U-tube may be momentarily established at any desired point in the stroke of the engine piston.

6. Power indicator for internal combustion engines comprising a gauge set including high and low pressure and vacuum gauges, a fitting adapted for open communication with the interior of the engine cylinder, a U-tube containing a semi-viscous liquid having one limb in open communication with said fitting and the other limb in open communication with the high pressure gauge and an adjustable cut off device calibrated in terms of piston stroke and adapted for operation by the engine for establishing momentary communication through the U-tube between the gauge set and the interior of the engine cylinder at any desired point in the stroke of the engine piston.

7. Power indicator for internal combustion engines comprising a gauge set including high and low pressure and vacuum gauges, a fitting adapted for open communication with the interior of the engine cylinder, a U-tube containing a semi-viscous liquid having one limb in open communication with said fitting and the other limb in open communication with the high pressure gauge and a cut-off device incorporated with the U-tube and comprising a pair of concentrically arranged sleeves one of which is adapted for continuous rotation and has a port in open communication with the limb of the U-tube which is connected up with said fitting whilst the other is capable of angular adjustment relatively to the rotary sleeve and has a port in open communication with the other limb of the U-tube communicating with the gauge set and means for determining the point in the piston stroke at which the ports in the two sleeves shall register with each other.

HARRY SHEPHARD.